United States Patent [19]

Behnke et al.

[11] Patent Number: 5,271,048

[45] Date of Patent: Dec. 14, 1993

[54] REPLACEMENT NOZZLE AND METHOD FOR REPLACING A NOZZLE IN A PRESSURE VESSEL

[75] Inventors: Harold W. Behnke; Richard T. Bottoms, both of Lynchburg; Larry D. Dixon, Forest, all of Va.

[73] Assignee: B&W Nuclear Service Company, Lynchburg, Va.

[21] Appl. No.: 993,536

[22] Filed: Dec. 21, 1992

[51] Int. Cl.⁵ ............................................. G21C 13/00
[52] U.S. Cl. .................................... 376/260; 376/307; 29/402.07; 29/402.08; 29/890.031; 228/119
[58] Field of Search ............... 376/260, 307, 204, 292, 376/294; 29/402.07, 402.08, 890.031, 890.036; 228/119

[56] References Cited

U.S. PATENT DOCUMENTS

| | | | |
|---|---|---|---|
| 4,440,339 | 4/1984 | Tamai et al. | 228/119 |
| 4,615,477 | 10/1986 | Spada et al. | 228/119 |
| 5,091,140 | 2/1992 | Dixon et al. | 376/260 |
| 5,094,801 | 3/1992 | Dixon et al. | 376/307 |
| 5,149,490 | 9/1992 | Brown et al. | 376/260 |
| 5,202,082 | 4/1993 | Brown et al. | 376/260 |

*Primary Examiner*—Daniel D. Wasil
*Attorney, Agent, or Firm*—Robert J. Edwards; D. Neil LaHaye

[57] ABSTRACT

A replacement nozzle and method for replacing a nozzle in a pressure vessel. The original nozzle is removed and a weld preparation is machined into the original weld. The vacated nozzle hole is partially drilled out from the interior of the vessel. A weld land sleeve is received in the drilled out portion of the nozzle hole and a replacement nozzle is received in the weld land sleeve. The sleeve and replacement nozzle are welded in place on the inside of the vessel wall.

4 Claims, 2 Drawing Sheets

REPLACEMENT NOZZLE AND METHOD FOR REPLACING A NOZZLE IN A PRESSURE VESSEL

BACKGROUND OF THE INVENTION

1. Field of the Invention

The present invention is generally related to pressure vessels and in particular to the replacement of nozzles in pressure vessels.

2. General Background

Pressure vessel components such as pressurizers in a nuclear steam system have nozzles that experience material failure due to stress corrosion cracking. This is a result of the susceptibility of the material, high stresses, and operation in a caustic environment. When a nozzle is found to contain cracks or there is leakage around the nozzle, it must be repaired or replaced.

A presently used replacement method that applicants are aware of consists of cutting off the existing nozzle at the pressure vessel shell and drilling out the remaining portion of the nozzle within the vessel wall. A j-groove weld preparation is then ground into the remaining original structural weld while insuring that a certain minimum amount of buttering material cover remains in the bottom of the groove. This is necessary to avoid welding too near the base materials which would then require weld heat treatment after welding in accordance with ASME code requirements. This is avoided because weld heat treatment of a portion of a pressurizer in this situation is impractical. The weld preparation surface and one-half inch beyond the weld preparation on adjacent surfaces then must be dye penetrant examined. A small void that is inherent to the weld process used to deposit the original structural weld requires an excessive amount of grinding to obtain cleared surfaces that are suitable for welding. The grinding process must be performed by personnel working inside the pressure vessel in a highly radioactive and uncomfortable environment. The process results in program delays, radiation exposure to personnel, and a risk to the successful completion of the work.

Patents that applicants are aware of that are directed to the replacement of sleeves or nozzles include the following.

U.S. Pat. No. 4,440,339 discloses a method for repairing the housing of a control drive mechanism. The housing is cut at a point between the weld joint with the sleeve and the inner surface of the reactor vessel. The lower portion of the housing is removed and a new housing is inserted into the sleeve and welded to the remaining housing portion.

U.S. Pat. No. 4,615,477 discloses a method for replacing tubes in a header or drum without removing the entire tube. The old tube is cut off level with the header and a recess is machined into the header to create a seat for a new tube. The remaining old tube is beveled and welded to the header at the bevel and a new tube is inserted into the seat and welded to the exterior of the header.

U.S. Pat. Nos. 5,094,801 and 5,091,140 disclose an apparatus and method for replacing a heater sleeve in a nuclear reactor coolant system pressurizer. The original heater and nozzle are removed and the bore enlarged. An outer sleeve is installed in the bore on the same center as the original sleeve. An inner sleeve is then installed in the outer sleeve to maintain the original heater alignment.

The problems associated with the void area that remains after a nozzle has been removed is not adequately addressed by the known art with regard to the time required to complete the repair and personnel exposure.

SUMMARY OF THE INVENTION

The present invention addresses the above problem in a straightforward manner. What is provided is a replacement nozzle and a method for replacing a nozzle that reduces the time and work required to remove the void inherent to the original weld and to install the replacement nozzle. The original nozzle is removed, a weld preparation is machined into the original weld, and the vacated nozzle hole is partially drilled out from the inside of the pressure vessel. A weld land sleeve is received in the drilled out portion of the nozzle hole and welded to the interior of the pressure vessel. A nozzle is installed through the weld land sleeve and the nozzle hole and welded in place. The weld land sleeve and nozzle may be separate or integral parts.

BRIEF DESCRIPTION OF THE DRAWINGS

For a further understanding of the nature and objects of the present invention reference should be had to the following description, taken in conjunction with the accompanying drawings in which like parts are given like reference numerals, and wherein.

DETAILED DESCRIPTION OF THE PREFERRED EMBODIMENT

Figure 1:
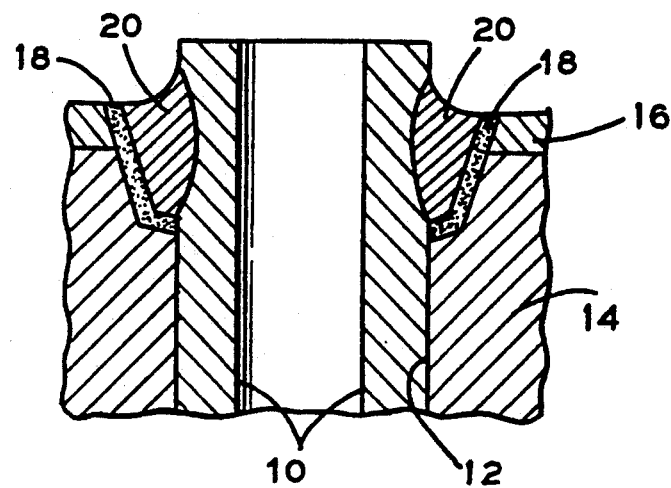
FIG. 1 is a section view that illustrates an original nozzle in a pressure vessel.
Figure 2:
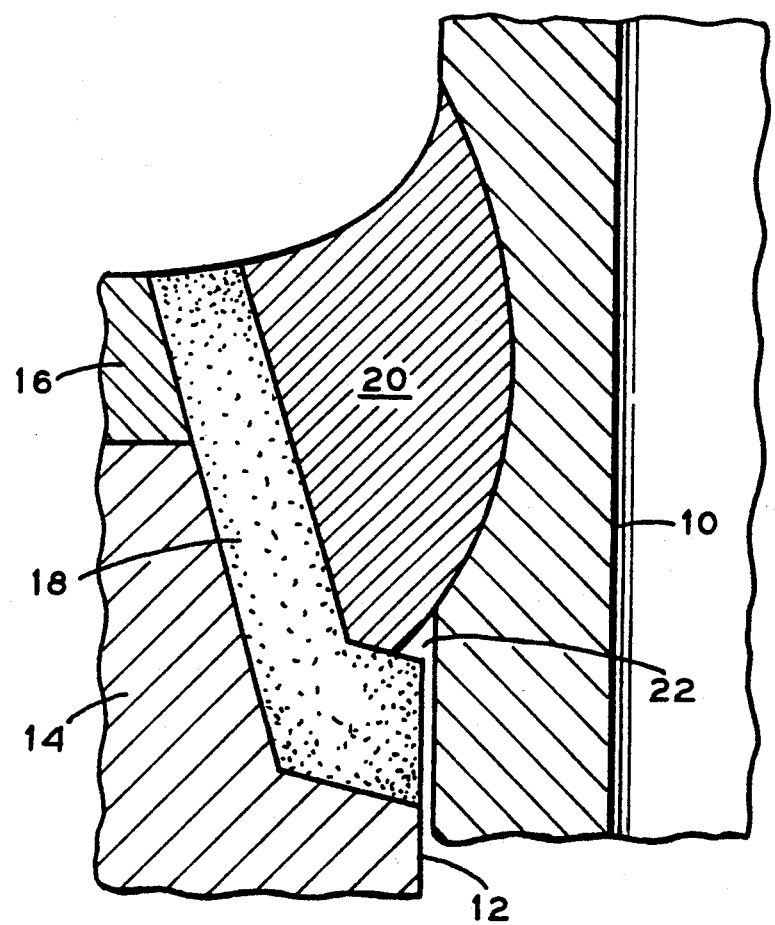
FIG. 2 is an enlarged view of an area of FIG. 1.

FIG. 1 illustrates an original nozzle 10 as it appears installed through a bore 12 in the wall 14 of a pressure vessel. Cladding 16 is formed from a corrosion resistant material such as stainless steel and is provided on the interior surface of wall 14. Buttering material 18 is provided in the form of a coating on wall 14 and cladding 16 to prevent the need for heat treatment of the weld metal and the base metal after the welding process is completed. Weld 20 holds original nozzle 10 in its installed position. As seen in the enlarged view of FIG. 2, there is a space 22 between original nozzle 10 and weld 20 that is inherent to the installation of original nozzle 10. Space 22 extends beyond bore 12. During nozzle replacement, it is required that such spaces that trap PT dye during examination be eliminated. Previous procedures requiring excessive grinding to obtain a suitable welding surface resulted in increased radiation exposure and equipment down time.

Figure 3:
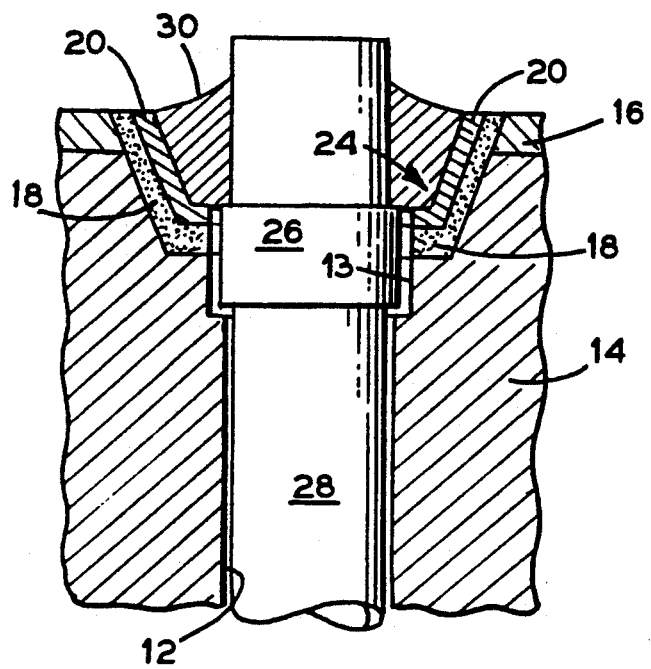
FIG. 3 illustrates the invention in its installed position.

The replacement nozzle and method of the invention eliminates the time consuming grinding previously required. The original nozzle 10 is removed by cutting it off at the exterior of wall 14. The remaining portion of original nozzle 10 is removed by using a suitable machining process such as drilling. A weld preparation in the form of a J-groove 24 is then machined into the original weld 20 as seen in FIG. 3. Bore 12 is then partially drilled out from the inside of the pressure vessel to provide a counterbore 13 adjacent the interior surface of wall 14. Weld land sleeve 26 is sized such that its exterior diameter closely matches the diameter of counterbore 13 and is readily received in counterbore 13. The interior diameter of weld land sleeve 26 is sized to receive replacement nozzle 28. Once in their installed position, weld land sleeve 26 and replacement nozzle 28 are welded in place as indicated by replacement weld 30. Weld land sleeve 26 and replacement nozzle 28 may be integral or separate pieces. If weld land sleeve 26 and replacement nozzle 28 are separate pieces, then they are welded together using weld 30.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. In a pressure vessel where an original nozzle has been removed, a weld preparation machined into the original weld, and the vacated nozzle hole being partially drilled out from the inside of the pressure vessel, a replacement nozzle, said replacement nozzle comprising:

a. a weld land sleeve received in the drilled out portion of the nozzle hole, said weld land sleeve being welded to the interior of the pressure vessel; and
   b. a nozzle received through said weld land sleeve and the nozzle hole.

2. The replacement nozzle of claim 1, wherein said nozzle is integral with said weld land sleeve.

3. The replacement nozzle of claim 1, wherein said nozzle is welded to said weld land sleeve.

4. A method for replacing a nozzle that extends into a pressure vessel through a bore in the wall of the pressure vessel comprising:

a. removing the existing nozzle;
   b. machining a weld preparation into the remaining original structural weld;
   c. partially drilling out the vacated nozzle hole from the inside of the pressure vessel; and
   d. installing a nozzle in the nozzle hole and a weld land sleeve in the drilled out portion of the nozzle hole by welding to the interior of the pressure vessel.

* * * * *